UNITED STATES PATENT OFFICE.

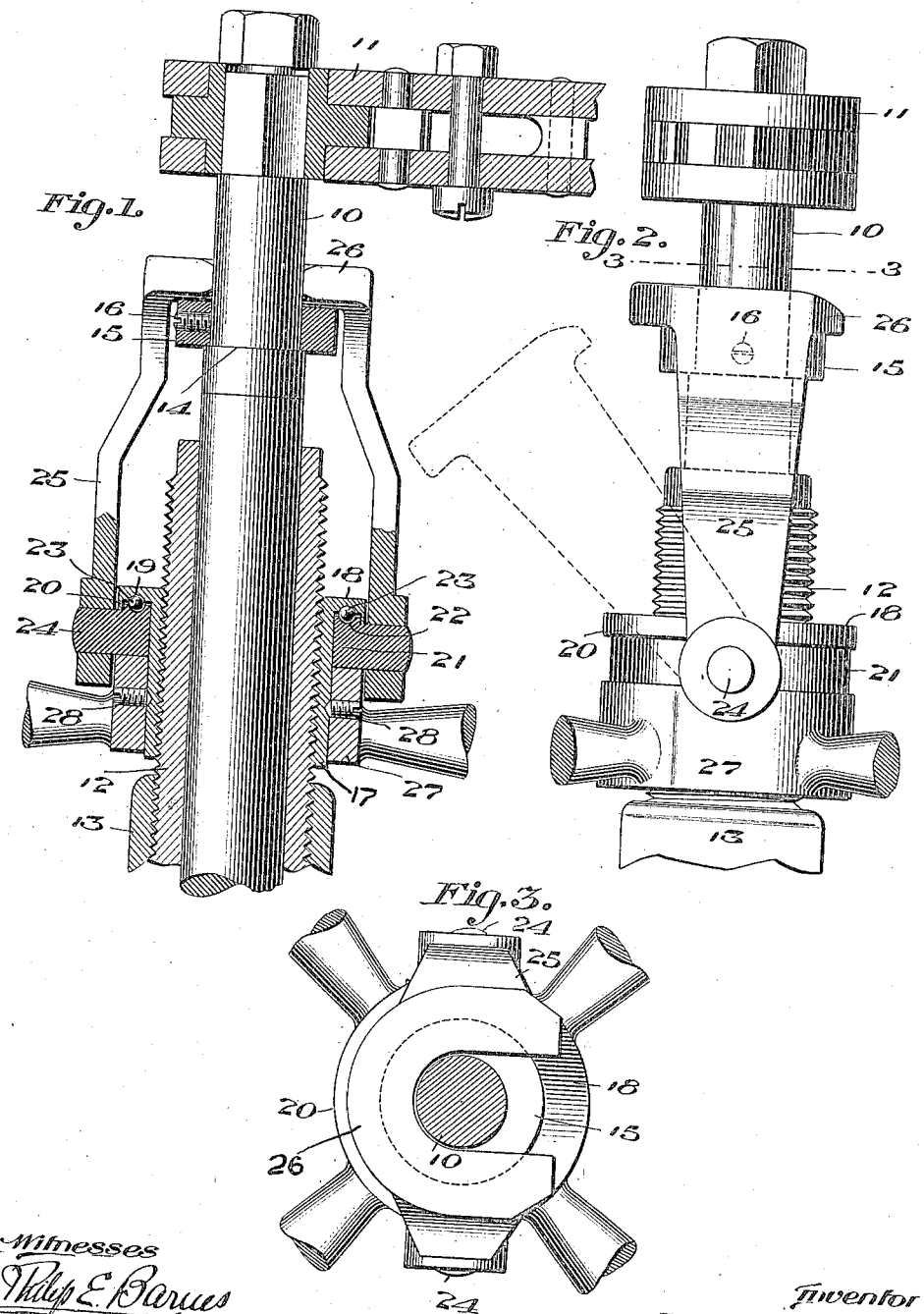

ROBERT H. MUELLER, OF DECATUR, ILLINOIS.

TAPPING-MACHINE.

1,301,730.

Specification of Letters Patent.

Patented Apr. 22, 1919.

Application filed June 7, 1917. Serial No. 173,386.

*To all whom it may concern:*

Be it known that I, ROBERT H. MUELLER, a citizen of the United States, residing at Decatur, in the county of Macon and State of Illinois, have invented new and useful Improvements in Tapping-Machines, of which the following is a specification.

This invention relates to tapping machines of the type having a rotatable boring bar carrying at one end a boring instrument or drill, a feed-nut which is employed to advance the boring bar but which is relatively stationary during the boring operation, and a connection or yoke between the nut and the bar for causing the bar to be advanced when the feed nut is rotated.

It has been customary in this type of machine to fixedly attach the yoke to the feed-nut and maintain the yoke stationary when the boring bar with which the yoke was in engagement was rotated. This resulted in an enormous amount of friction between the contacting or bearing surfaces of the yoke and the boring bar or a thrust collar thereon, and during the drilling operation the operator had to overcome this friction in addition to the resistance of the drill point. Furthermore, tapping machines are often employed in places where dirt, sand, and the like, are likely to get in between the bearing surfaces, and when this occurred, the bearing surfaces became damaged, which increased the friction between the parts and which caused the parts to wear out in a short time, necessitating renewal thereof.

This invention has as its object to provide a feed yoke which is rotatably connected to the feed-nut, anti-friction means or ball-bearings being interposed between the contacting surfaces to reduce friction to a minimum, and obviate wearing away of the parts. The device is so constructed that dirt, or the like cannot gain access to the bearing surfaces, thus eliminating all chance of injury to these surfaces, and, at the same time, my improvement provides for the disassembling of the parts in an easy and ready manner for purposes of renewal or cleaning of the parts.

The above and other objects of my invention are obtained by the structure described in the following specification and illustrated in the accompanying drawings and wherein—

Figure 1 is a sectional view taken through the outer end of the tapping machine and showing so much of the machine as is necessary to illustrate my invention.

Fig. 2 is an elevational view of the outer end of the tapping machine, taken at right angles to Fig. 1.

Fig. 3 is a sectional view taken on line 3—3, Fig. 2.

Referring to the drawings by numerals, like numbers representing like parts in the several views, 10 designates the boring bar to the inner end of which a drill (not shown) is adapted to be detachably connected. The boring bar 10 has at its outer end a ratchet handle 11 which may be of any suitable construction, that shown in the drawings, being by way of illustration only. The boring bar 10 passes through a feed-screw 12 which is connected to the body portion of the machine 13 in any approved manner, only a small part of the body portion of the machine being disclosed as it forms no part of my invention.

The boring bar 10 at its outer end is of somewhat reduced diameter thus providing a shoulder 14 which forms an abutment upon which a feed or thrust collar 15 rests, the collar being fixed in place upon the boring bar by means of a set screw 16.

Threaded on the feed-screw 12 is a feed-nut 17 which comprises a centrally bored and threaded cylindrical sleeve having at its outer end an outwardly extending or circumferential flange 18 which is provided on its inner or under surface with a groove 19. Depending downwardly from the outer edge of the flange 18 is an annular or cylindrical lip or flange 20 which is employed to prevent dirt, dust, or the like from gaining access to the bearing surfaces.

Numeral 21 designates a rotatable annular ring fitting about the feed-nut 17 and having on its upper surface a groove 22 which is in alinement with the groove 19 of the flange 18 to form a raceway for ball-bearings 23. The ring 21 is of such thickness that it will fit at its upper edge within the space between the inner surface of the lip 20 and the outer surface of sleeve portion of the feed nut and the dimensions of the parts are such that this fit is rather close or snug, so as to prevent dust, sand, or the like, from passing through the small space between the lip and the ring, but, at the same time, sufficient clearance is provided to prevent the introduction of any excessive friction.

Extending radially from diametrically opposite points on the ring 21 are pintles or pivot pins 24 which are adapted to be received in the openings in the lower ends of the arms 25 of the feed-yoke. The feed-yoke has, at the upper ends of the arms 25, a plate 26 which is centrally slotted or bifurcated so that the plate may straddle the boring bar as shown in Fig. 3. It will be seen that the plate 26, when the yoke is in the position shown in full lines in the drawings, bears against the outer or upper surface of the feed collar 15.

The ring 21 is maintained against longitudinal movement upon the feed-nut 17 by means of an annular locking ring 27 which fits snugly about the lower end of the feed-screw 17 and which is maintained thereon by means of set-screws 28. It is, of course, to be understood that any other suitable means may be employed for maintaining the annular ring 27 in place. The annular ring 27 is provided with a plurality of handles 29, to permit turning of the feed-nut.

It will be understood from the above description, that when the ratchet handle is operated to rotate the boring bar, the bar, the feed-yoke and the annular ring 21 rotate in unison, and thus form a revolving unit which is distinct from all other parts of the machine. The anti-friction means, in the present instance, the ball bearings 23, reduce to a great degree friction between the revolving ring 21 and the feed-nut, the latter being normally stationary during the boring operation. When it is desired to feed the boring bar forwardly as the drill is forced into the material being cut, the feed-nut is rotated by means of the handle 29, thus causing the nut to be fed inwardly or downwardly upon the feed-screw 12 and causing the plate of the yoke to bear upon the feed collar.

It will be noted that in accordance with my invention all of the parts are securely locked in place, so that all danger of losing any of the parts is overcome, and, yet, at the same time, means are provided for removing the feed-yoke from the feed-nut for the purposes of renewal or cleaning of the bearings or other parts. The ball-bearings are inclosed and thus protected from dust, sand, and the like, and my device presents a neat and simple construction which may be manufactured at a relatively low cost.

What is claimed is:—

1. In a tapping machine, a boring bar, a feed nut a feed yoke pivotally connected to said nut and having rotary movement relative thereto, and anti-friction means interposed between the yoke and the nut.

2. In a tapping machine, a boring bar, a feed nut, a rotatable ring about said nut, and a feed yoke pivotally carried by said ring.

3. In a tapping machine, a boring bar, a feed screw, a feed nut threaded on the screw, a rotatable annular ring about the nut, bearings between the opposed surfaces on said nut and ring, and a yoke carried by the ring and engaging against the boring bar.

4. In a tapping machine, a boring bar having an abutment, a feed screw through which the bar passes, a feed nut threaded on the screw, a ring about said nut and having diametrically disposed and radially extending pintles, a feed yoke comprising a pair of arms having openings to receive said pintles and a plate carried by said arms and being slotted to straddle said bar and bear against said abutment, and bearings interposed between the opposed surfaces on said nut and ring.

5. In a tapping machine, a boring bar, a feed nut having a circumferential flange, a rotatable ring about said nut, a yoke carried by said ring, and bearings between the opposed surfaces of the flange and ring.

6. In a tapping machine, a boring bar, a feed nut having a circumferential flange and an annular lip depending from said flange, a rotatable ring about said nut and fitting within said lip, bearings between the opposed surfaces on the flange and ring, and a yoke carried by said ring.

7. In a tapping machine, a boring bar having an abutment, a feed nut having a circumferential flange and an annular lip extending from the edge of said flange, a rotatable ring about one end of said nut and fitting within said lip, bearings between the opposed faces on the flange and rotatable ring, a yoke pivoted to said ring and bearing against said abutment on the boring bar, and a locking ring on the lower end of the nut for retaining said rotatable ring against displacement.

8. In a tapping machine, a boring bar having an abutment, a feed nut having a circumferential flange and an annular lip extending from the edge of said flange, a rotatable ring about one end of said nut and fitting within said lip, bearings between the opposed faces on the flange and rotatable ring, a yoke pivoted to said ring and bearing against said abutment on the boring bar, a locking ring on the lower end of the nut for retaining said rotatable ring against displacement, and means for detachably securing said locking ring in place.

9. In a tapping machine, a boring bar, a feed nut and a feed yoke pivotally connected to said nut and having rotary movement relative thereto.

In testimony whereof I have hereunto set my hand in presence of two subscribing witnesses.

ROBERT H. MUELLER.

Witnesses:
CHAT. WINEGARDEN,
FRED. E. KLINCK.

Copies of this patent may be obtained for five cents each, by addressing the "Commissioner of Patents, Washington, D. C."